United States Patent [19]

Kittel et al.

[11] 4,386,585
[45] Jun. 7, 1983

[54] LIQUID FRICTION COUPLING

[75] Inventors: Friedrich Kittel, Schweinfurt; Kurt Fädler, Niederwerrn; Peter Anders, Schweinfurt, all of Fed. Rep. of Germany

[73] Assignee: Fichtel & Sachs AG, Schweinfurt, Fed. Rep. of Germany

[21] Appl. No.: 341,477

[22] Filed: Jan. 21, 1982

[30] Foreign Application Priority Data

Jan. 30, 1981 [DE] Fed. Rep. of Germany ....... 3103064

[51] Int. Cl.³ .................................................. F01P 5/04
[52] U.S. Cl. .................................. 123/41.12; 192/82 T
[58] Field of Search .......................... 123/41.12, 41.49; 192/58 B, 82 T

[56] References Cited

U.S. PATENT DOCUMENTS

| 4,007,819 | 2/1977 | Maci | 192/58 B |
| 4,090,596 | 5/1978 | Blair | 192/58 B |
| 4,188,785 | 2/1980 | Ando et al. | 192/58 B X |
| 4,228,880 | 10/1980 | Gee | 192/58 B |

FOREIGN PATENT DOCUMENTS

| 1147266 | 4/1969 | United Kingdom . |
| 1195794 | 6/1970 | United Kingdom . |
| 1515559 | 6/1978 | United Kingdom . |
| 1515560 | 6/1978 | United Kingdom . |
| 2057641 | 4/1981 | United Kingdom . |

Primary Examiner—William A. Cuchlinski, Jr.
Attorney, Agent, or Firm—Toren, McGeady and Stanger

[57] ABSTRACT

A liquid friction coupling is provided for driving a fan wheel in connection with the cooling system of an internal combustion engine. The liquid friction coupling is manufactured as a pre-assembled unit. The unit comprises a shaft, a rotor fastened on the shaft and a shear liquid housing rotatably mounted on the shaft and enclosing the rotor. A partition wall defines two working spaces within the housing. This partition wall is provided with an opening. A valve lever is associated with said opening for selectively closing or clearing said opening so as to vary the torque transmission between the rotor and the housing. The valve lever is actuated, e.g. by a bi-metallic actuator member, subject to external temperature. The shaft is provided with a central bore. A fastening screw passes said central bore for fastening said shaft to a rotating member driven by the engine. The end of the screw which is remote from the engine is easily accessible for a tightening key. Components which cover the screw head are either provided with openings permitting access to the screw head or such components are easily fittable to the unit.

13 Claims, 7 Drawing Figures

LIQUID FRICTION COUPLING

BACKGROUND OF THE INVENTION

1. Field of the Invention

This invention relates to a liquid friction coupling, especially for driving fans of liquid-cooled internal combustion engines, comprising a shaft rotating about an axis of rotation which is driven by the internal combustion engine at its end near the engine and carries a rotor on the end remote from the engine, further comprising a housing surrounding the rotor, which housing defines shear liquid torque-transmission means together with the rotor and carries the fan wheel, a shear liquid within the housing, a bearing between the housing and the shaft, a housing front wall facing the radiator of the internal combustion engine and carrying on the outer side thereof a temperature-responsive actuator member which acts through a transmission member upon a valve lever arranged in the housing.

2. The Prior Art

A liquid friction coupling of the above-stated type of construction is known, for example, from German Auslegeschrift No. 2,602,660. This known liquid friction coupling is rotatably mounted on a shaft which in turn comprises a flange for being secured on a corresponding counter-flange of the engine which is driven by the engine. The securing is effected by screws which connect the two flanges with one another and have to be introduced into the appropriate openings parallel to the axis of rotation.

It is an object of the present invention to produce a liquid friction coupling for driving fans which, especially in axial direction, has a reduced length and can easily be fitted from the front side.

SUMMARY

In view of this object, it is proposed that the shaft carrying the rotor is connectable with a drive member driven by said internal combustion engine, through a centrally arranged screw which is accessible from the exterior through an appropriate opening in the actuator member and/or in the front wall, and the transmission of the control movement from the actuator member to the valve lever takes place in an area radially offset from said openings. In this case securing is effected by a central screw which can be introduced through corresponding openings in the actuator member and/or in the front wall. The transmission of the control movement for temperature regulation then takes place radially outside these openings.

BRIEF DESCRIPTION OF THE DRAWINGS

The invention will be explained in greater detail below by reference to the examples of embodiments represented in the figures, wherein.

DETAILED DESCRIPTION

Figure 1:
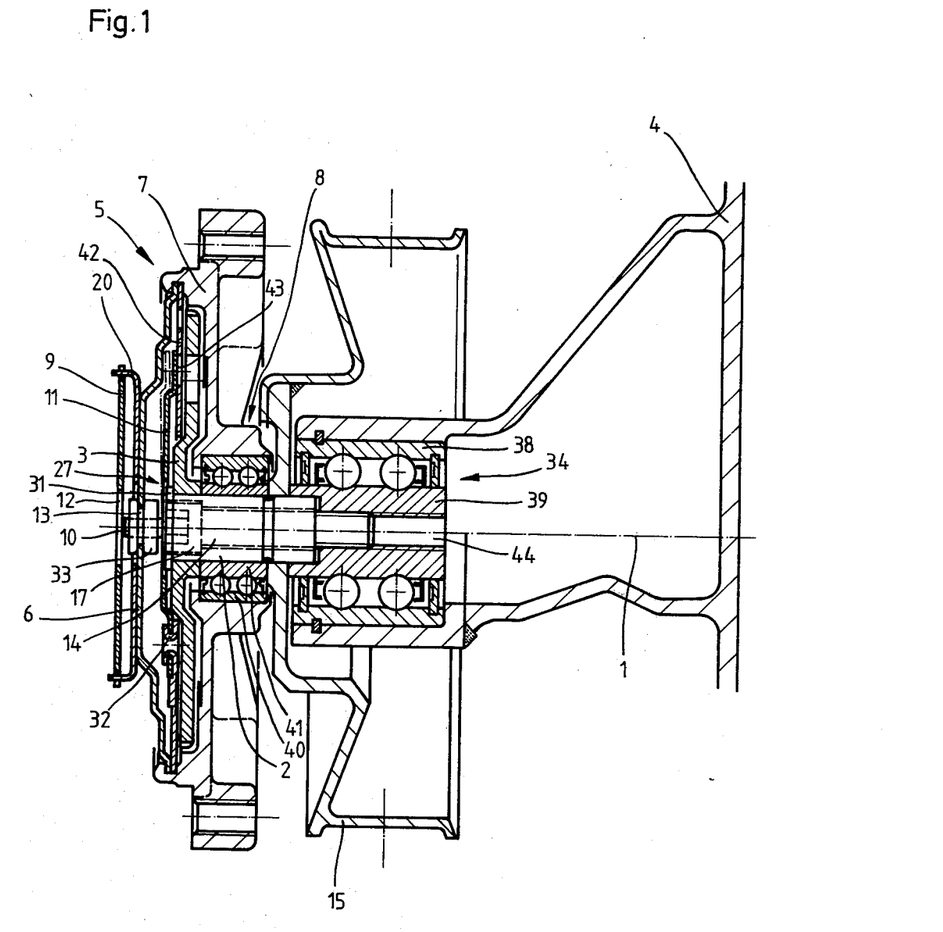
FIGS. 1 and 2 show a longitudinal section and a view of a liquid friction coupling with transmission of the control movement through two pins extending parallel to the axis of rotation.
Figure 2:
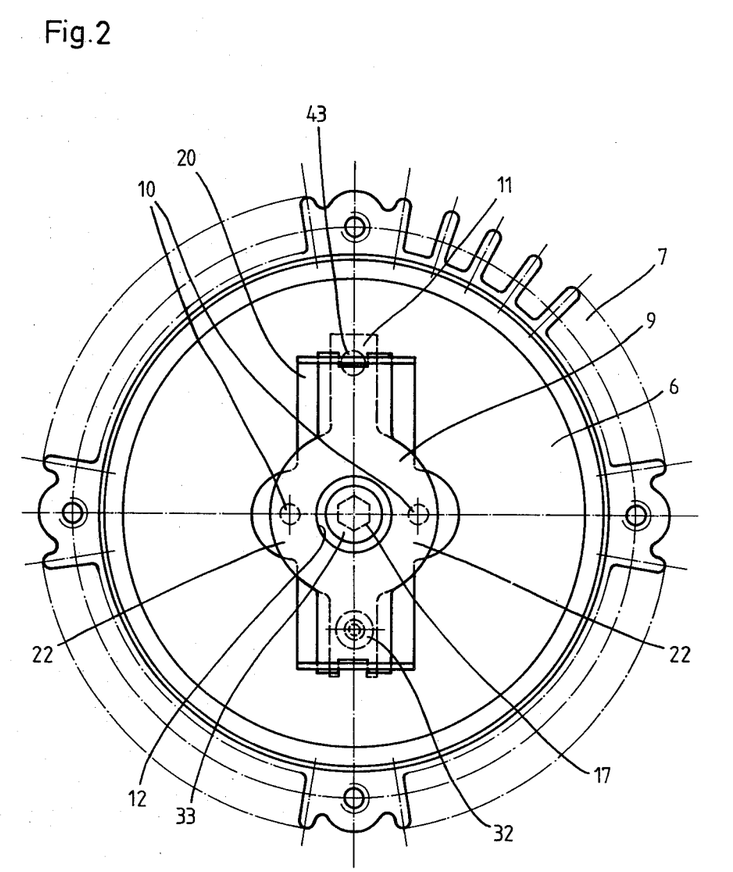

FIGS. 1 and 2 show the longitudinal section and the front end view of a liquid friction coupling. The fan blades screwed to the housing rear wall 7 are not illustrated in each case. In the present case, a shaft 2 is rotatably mounted together with the inner race ring 39 on the internal combustion engine 4 through a bearing arrangement 34 having an inner race ring, an outer race ring 38 and appropriate rolling bodies. The shaft 2 and the inner race ring 39 are both driven from a rotating part of the internal combustion engine 4 by a drive member 15, in the present case in the form of a belt pulley. However, it is also possible that the internal combustion engine 4 comprises a rotating shaft extending to the exterior, said shaft being provided in lieu of the inner race ring 39, in which case the drive member 15 could be omitted. The drive member 15 and the inner race ring 39 rotate about the axis of rotation 1. The entire fan coupling is now screwed to the inner race ring 39 by means of the shaft 2 and the screw 14. In order to make a counter-holding possible, for example, on the drive member 15 during fitting, the latter and also the inner race ring 39 each are irrotatably engaged with the shaft 2, for example, by planar engagement faces, where the two parts are penetrated by the shaft 2. On the shaft 2, starting from the inner race ring 39, the following parts are arranged one behind the other: the drive member 15 in the form of a belt pulley, the inner race ring 41 of the bearing 8 and the rotor 3. All these parts are axially braced and held in axial direction by the screw 14 and by means of the collar 31 of the shaft 2. The rear wall 7 of the housing 5 is rotatably mounted on the outer race ring 40 of the bearing 8, the housing 5 also comprising a housing front wall 6. The rotor 3 extends within the housing 5—between the housing rear wall 7 and the housing front wall 6—and forms torque transmission surfaces with the inner walls of the housing 5. In addition, the housing 5 is partially provided with a shear liquid for the torque transmission. For the regulation of this torque transmission, between the housing front wall 6 and the rotor 3 a partition 42 is provided having at least one valve opening 43 which is controlled by a valve lever 11 in response to the prevailing external temperature. On the outside of the front wall 6 of the housing a holder 20 is arranged which carries an actuator member 9. This actuator member 9 is, for example, a bimetallic element. As may be seen especially from FIG. 2, this actuator member 9 is provided with two widenings 22 which act through the two pins 10 upon the valve lever 11. These pins extend in parallel to the axis of rotation 1 opposite to one another at equal distances from the axis and are slidably mounted in the housing front wall 6, such as to act upon the valve lever 11, which has a shape similar to the shape of the actuator member 9. The valve lever 11 is secured with its one end by a rivet 32 to the partition 42, extends beyond the axis of rotation 1 to the opposite side, there may cover the valve opening 43 in the partition 42, and has in the region of the axis of rotation 1 an opening 27 serving for the introduction of the key for tightening the screw 14. Moreover, in the housing front wall 6, an opening 13 is provided which may be closed by a bung 33, and furthermore in the actuator member 9 an opening 12 is also provided. All these openings 12, 13, 27 have a diameter smaller than the distance between the two pins 10.

The assembly and operation of the liquid friction coupling are as follows:

Only the bearing 34 is fitted on the internal combustion engine 4. The liquid friction coupling is preassembled completely with the fan blades (not shown), without the bung 33. Now the drive member 15 is pushed onto the free end of the shaft 2 protruding from the fan coupling and the shaft 2 is introduced into the corresponding bore of the inner race ring 39. There is a torque transmitting connection between the shaft 2 on the one hand and the drive member 15 and the inner race ring 39 on the other hand, so that the screw 14, preferably made as a screw having a hexagonal recess, can be tightened in the threading 44 of the inner race ring 39—by counter-holding on the drive part 15. Finally, the bung 33 is inserted into the opening 13 of the housing front wall 6, in order to keep dirt out of the interior of the liquid friction coupling and to prevent loss of liquid. Due to the formation of the opening 13 with a diameter smaller than that of the head 17 of the screw 14 it is possible, even without the bung 33, to arrange the screw 14 in the liquid friction coupling so that it cannot be lost. This quite substantially facilitates the fitting of the liquid friction coupling, if it is taken into consideration that such accessories are normally purchased completely from the motor vehicle manufacturers.

Next the operation of the liquid friction coupling is to be discussed briefly, this operation also being applicable to the other embodiments described hereinafter. The radiator (not shown) of the liquid-cooled internal combustion engine is arranged—seen in the direction of travel—in front of the liquid friction coupling, i. e. on the left side of FIG. 1, so that the air stream flowing through the radiator, after being heated, flows around the liquid friction coupling. Below a predetermined temperature level the rotor 3, driven through the drive member 15 by the internal combustion engine, transmits only a very low torque to the housing 5 and thus to the fan blades. Now, the actuator member 9 is in the position as illustrated, and its stress force effects, through the pins 10 and the valve lever 11, that the valve opening 43 is closed. If now the temperature in the radiator rises, the actuator member 9 is heated correspondingly, and from a predetermined temperature level, the actuator member 9 domes forward, i. e. to the left in FIG. 1, and through the pins 10 liberates the valve lever 11, so that the valve opening 43 is no longer closed. The torque transmission capacity of the coupling is thereby greatly increased, so that the slip between the rotor 3 and the housing 5 is reduced and the fan blades are driven faster so as to support the cooling of the radiator. This condition persists until the temperature level has again dropped below the predetermined level. It is presumably not necessary to explain further that the openings 12, 13 and 27 are arranged concentrically in relation to the axis of rotation 1 and the two pins 10 are provided preferably on a line perpendicular to the connecting line between rivet 32 and valve opening 43, said connection line extending through the axis of rotation 1. This arrangement provides a satisfactory transmission of the control movements from the actuator member 9 to the valve lever 11.

Figure 3:
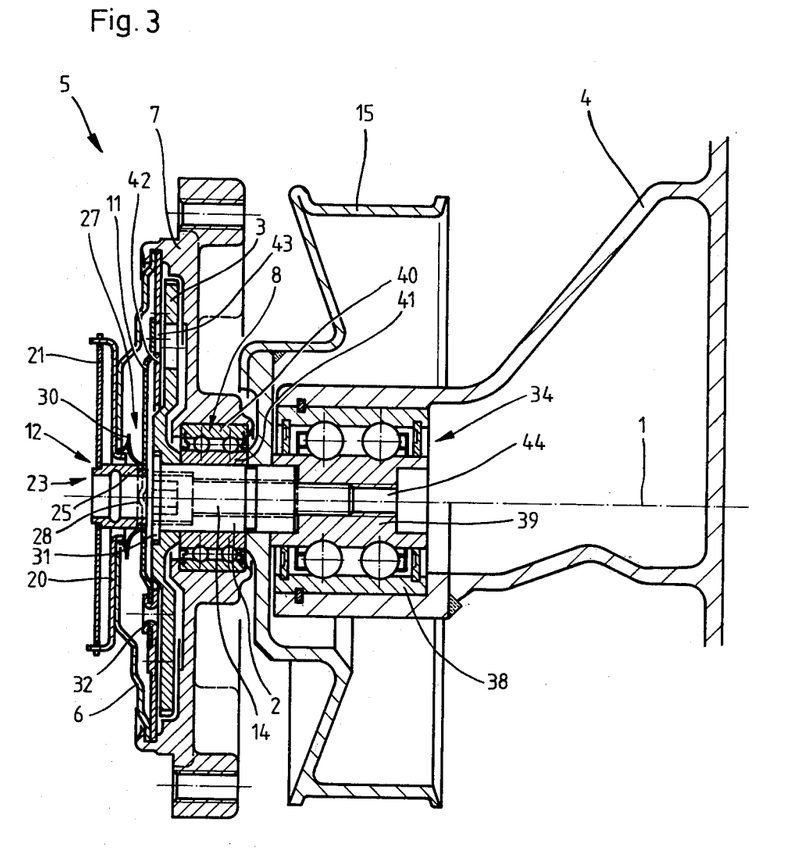
FIGS. 3 and 4 show a longitudinal section and a view of a liquid friction coupling with transmission of the control movement through a bush guided in the actuator member and in the valve lever.
Figure 4:
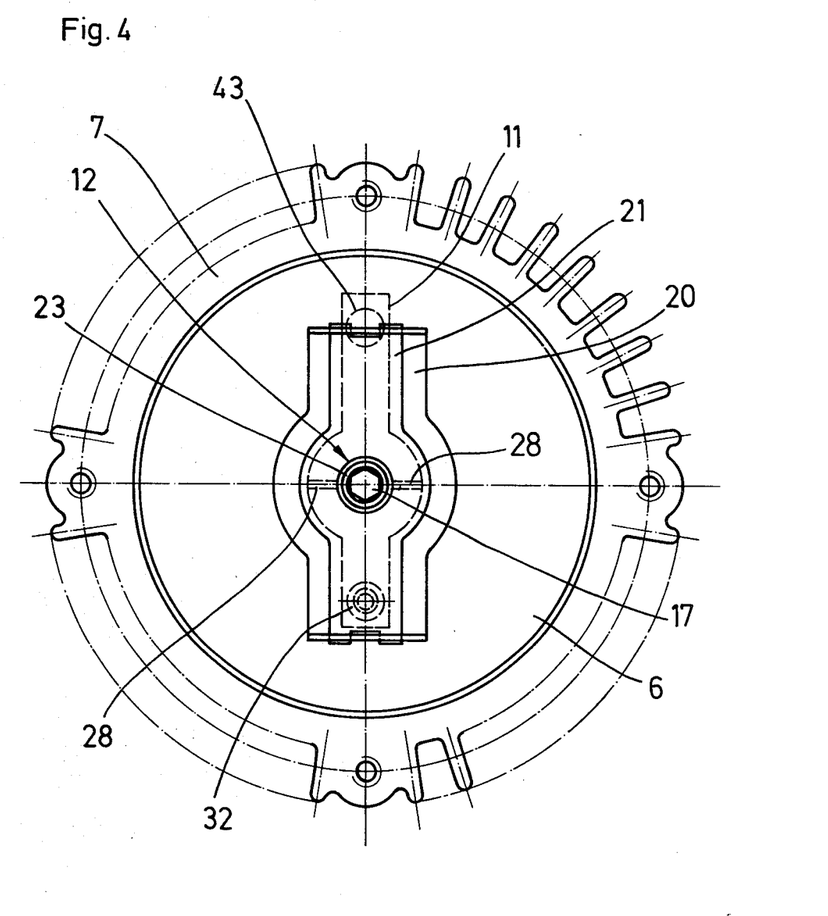

In FIGS. 3 and 4 there are illustrated a longitudinal section and an elevation of a liquid friction coupling which, in comparison with the embodiments according to FIGS. 1 and 2, has a different transmission of the actuation movement of the actuator member. The assembly of this fan coupling is just the same as that of FIGS. 1 and 2, and all the parts are also of like formation, so that a repetition of the description of assembly is superfluous. In departure from the preceding embodiment, however, here an actuator member 21 is provided, for example, in the form of a bimetallic element, which transmits the actuation movement to the valve lever 11 through a bush 23 arranged concentrically with the axis of rotation 1. This bush 23 is provided with a collar 25 which has a larger external diameter than the axial extensions of the bush 23 adjoining the collar 25 in both axial directions. The bush 23 is received with these two extensions in corresponding openings 12 in the actuator member 21 and 27 in the valve lever 11. The valve lever 11 is provided, preferably perpendicularly of its longitudinal extent, with embossings 28, the line of connection of which extends through the axis of rotation 1 and which bear with their outward doming on the collar 25 of the bush 23. Thus at this point a linear contact is guaranteed, for a better transmission of the actuation movement. For sealing the bush 23 from the interior space of the liquid friction coupling, a bellows seal 30 is provided which is fitted on the inwardly curled edge of the holder 20 and moreover on the external circumference of the collar 25. It is further advisable, after assembly has taken place, to close the free internal diameter of the bush 23 with a bung.

The operation of this fan coupling is in principle the same as already described with reference to FIGS. 1 and 2, with the exception that in the present case the actuation movement of the actuator member 21 is transmitted through the bush 23 to the valve lever, which also here performs a pivoting movement about the rivet 32 in order to cover and clear the valve opening 43. The other components are the same as those which are already known from FIGS. 1 and 2. The screw 14 can be mounted through the bore of the bush 23 before the bung is attached.

It should be mentioned that all liquid friction couplings using the central fastening mode as described herein can readily be fitted directly from the front onto a shaft driven by the internal combustion engine, if such a free shaft stub is available.

Figure 5:
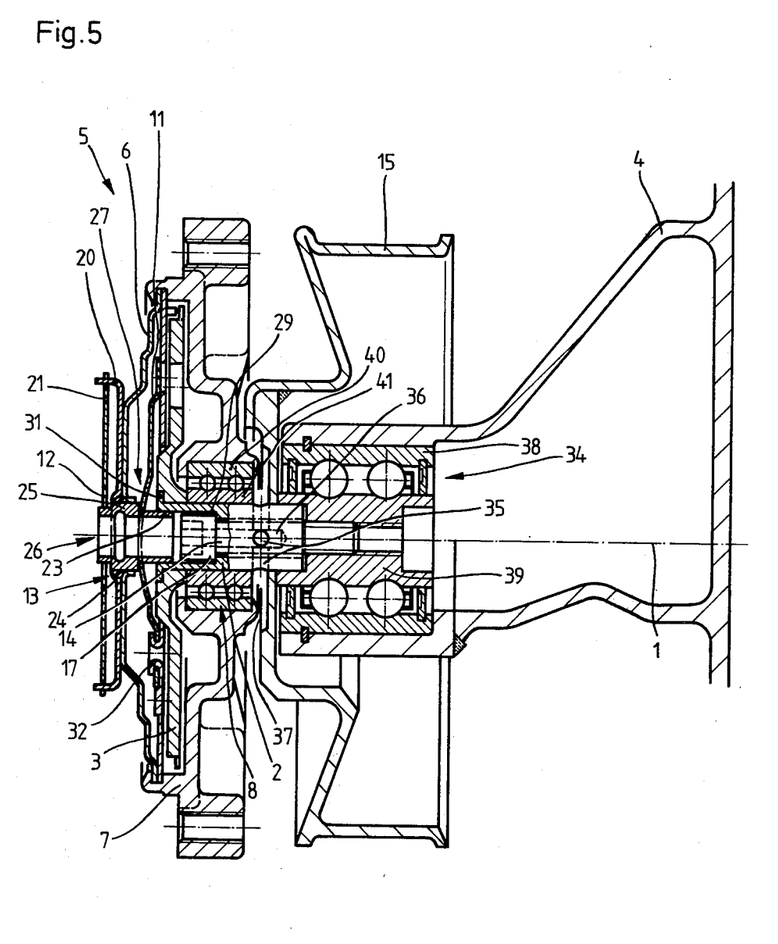
FIGS. 5 and 6 show a longitudinal section and a view of a liquid friction coupling with guidance of the actuation movement transmission bush in the housing front wall and in the shaft.
Figure 6:
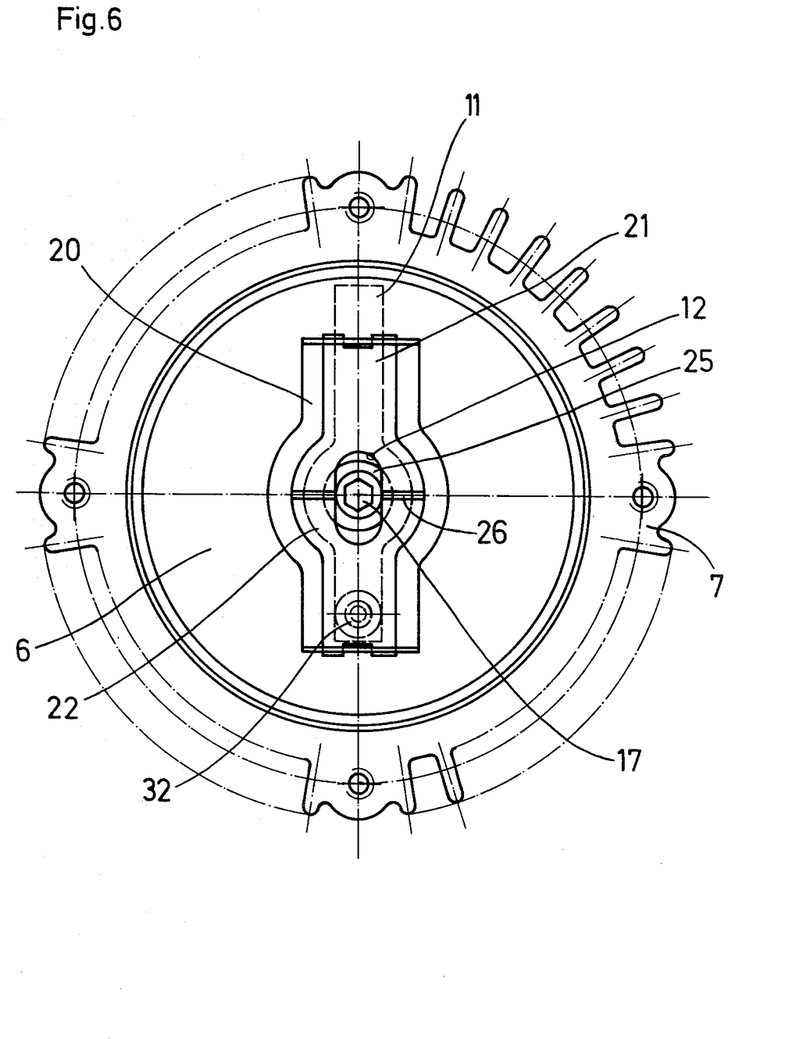

A further embodiment of a liquid friction coupling is illustrated in FIGS. 5 and 6. This embodiment is distinguished from the embodiment shown in FIGS. 3 and 4 in that the bush 23 for transmitting the actuation movement has a different construction. In the present case this bush 23 is slidably mounted directly in the housing front wall 6 and for better guidance is additionally inserted with its end facing the internal combustion engine into the internal bore 29 of the shaft 2, for guidance. For this purpose the screw head 17 is arranged to be sunk into the shaft 2 in the direction towards the internal combustion engine, in order to permit the bush 23 additionally to extend into the internal bore 29. This embodiment guarantees a satisfactory guidance of the bush 23, and during operation of the internal combustion engine and the liquid friction coupling, no additional sealing elements are necessary. Thus the bush 23 is slidably mounted with its collar 25 of larger diameter in the housing front wall 6 and passes with an extension of smaller diameter through a corresponding opening 12 in the actuator member 21. As may be seen especially from FIG. 6, this opening 12 is either a slot or is elliptical. In the narrowest region of this opening 12, bendings 26 projecting towards the internal combustion engine 4 are formed in the actuator member 21 and extend perpendicularly of the longitudinal extent of the actuator member, their line of connection intersecting the axis of rotation 1. With these bendings the actuator member 21 bears on the collar 25 of the bush 23 in axial direction and has a linear contact therewith. On the opposite side the valve lever 11 rests with a doming of large diameter in axial direction against the collar 25, the valve lever 11 having a corresponding opening 27 in this region. Especially with regard to transporting of the pre-assembled liquid friction coupling, it can be advantageous if the bush 23 is sealed off from the housing front wall 6 by a gasket 24.

The manner of assembly and the operation of this liquid friction coupling do not differ from the two previous embodiments, so that it is possible to dispense with a detailed description. As essential differences from the two previous embodiments, in the present case it is proposed to provide the screw 14 with a longitudinal bore 36, from which transverse bores 35 extend which correspond to radially extending openings 37 arranged in the drive member 15, namely on the side remote from the engine 4 in the region of contact with the inner race ring 41 of the bearing 8. Thus it is possible to apply a certain quantity of cooling air even to the side of the liquid friction coupling outside the airflow, and thus to ensure a more uniform temperature of the liquid friction coupling.

Figure 7:
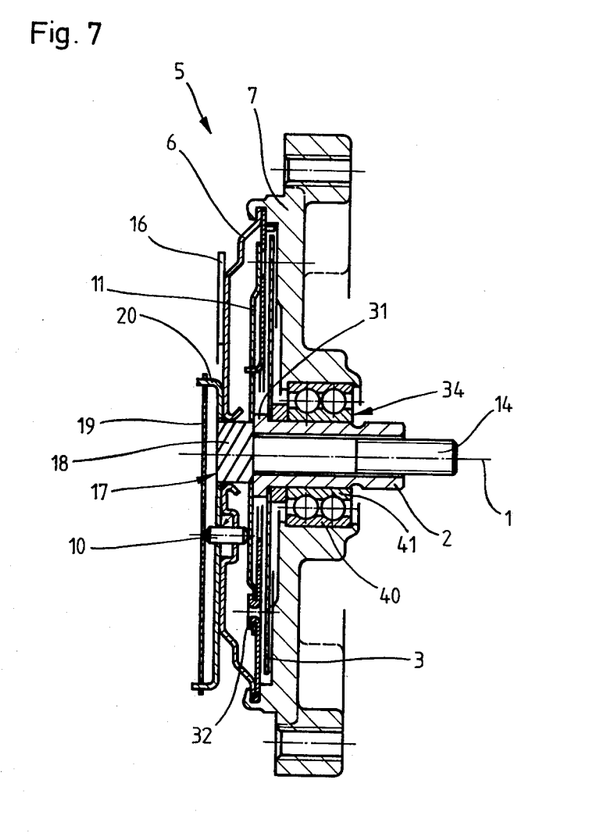
FIG. 7 shows a partial longitudinal section through an arrangement including the eccentrically arranged actuator member and the transmission pin.

Finally, FIG. 7 shows a partial longitudinal section through a liquid friction coupling in which central fitting is possible due to the face that the actuator member 19 is arranged eccentrically of the axis of rotation 1 and the transmission of the actuation movement to the valve lever 11 is effected by a pin 10 which is arranged so far parallel beside the axis of rotation 1 that the screw 14 can readily be accommodated centrally. In the present construction, after the assembly of the liquid friction coupling has taken place and the screw 14 has been tightened, finally the actuator member 19 is to be inserted into the holder 20. Furthermore, in the present construction, the screw head 17 is provided with spiral grooves 18 which guarantee a repelling of the liquid supplied to the liquid friction coupling and thus to achieve a seal in the simplest manner. A counter-weight 16 is provided for mass balancing for this a symetric arrangement of actuator member 19, holder 20 and pin 10.

The remaining components and the operation of this liquid friction coupling are identical with the forms of embodiment as already described.

All the described embodiments of liquid friction couplings can be fitted from the front in a quite simple way, without need for action with a spanner of other tool behind the liquid friction coupling. This results in a construction which is substantially more compact in the axial direction, consequently a lower loading of the bearings and thus a longer life. Moreover, the space, which is becoming ever more scarce, is optimally exploited.

The operation principle of the type of liquid friction couplings used in accordance with this invention is known, for example, from German Pat. No. 1,475,327.

We claim:

1. In a liquid friction coupling, especially for driving fans of liquid-cooled internal combustion engines, comprising a shaft (2) rotating about an axis of rotation and driven at its end facing the internal combustion engine (4) by the engine (4) and carrying a rotor (3) at the end remote from the internal combustion engine (4), further comprising a housing (5) surrounding the rotor (3), which housing (5) defines shear liquid torque transmission means together with the rotor (3) and carries the fan wheel, a shear liquid within said housing (5) a bearing arrangement (8) between said housing (5) and said shaft (2), a housing front wall (6) facing the radiator of the internal combustion engine (4), said front wall (6) carrying on its outer side a temperature-responsive actuator member (9) acting through at least one transmission member (10) upon a valve lever (11) arranged in the housing (5), the improvement which consists in that the shaft (2) carrying the rotor (3) is connectable with a drive member (15) driven by said internal combustion engine (4), through a centrally arranged screw (14) which is accessible from the exterior through an appropriate opening (12, 13) in at least one of the actuator member (9, 19, 21) and the front wall (6), and the transmission of the control movement from the actuator member to the valve lever (11) occurs in an area radially offset from said openings (12, 13).

2. A liquid friction coupling as set forth in claim 1, wherein the actuator member (19) is eccentrically arranged, the transmission member shaped as a pin (10) penetrates the front wall (6) at a distance from the axis of rotation (1) and the opening (13), arranged concentrically with the axis of rotation, in the front wall (6) for the screw (14) is closed by a screw head (17).

3. A liquid friction coupling as set forth in claim 1, wherein a sealed contact joint or labyrinth seal is arranged between said opening (13) and a screw head (17) of said screw (14).

4. A liquid friction coupling as set forth in claim 1, wherein a screw head (17) of said screw (14) is provided with repelling spiral grooves (18).

5. A liquid friction coupling as set forth in claim 1, wherein the actuator member (9) comprises, preferably in the region of the axis of rotation (1), a widening (22) with a concentric opening (12), and wherein in this region two opposite pins (10) are arranged parallel and symmetrically with respect to the axis of rotation (1) and equidistantly therefrom said pins acting upon the valve lever (11) having substantially the same shape as said actuator member (9).

6. A liquid friction coupling as set forth in claim 1, wherein said transmission member is a bush (23) which is arranged concentrically with the axis of rotation (1) between said actuator member (21) and said valve lever (11), said bush (23) penetrating the front wall (6) through a corresponding opening (13) thereof and defining a passage for the introduction of the screw (14) and a key for mounting said screw.

7. A liquid friction coupling as set forth in claim 6, wherein a section of said bush (23) is slidably quided in said opening (13) of the front wall (6) in axial direction and an extension of said bush (23) of reduced diameter penetrates an opening (12) of said actuator member (21), an axially directed shoulder face of said bush being in linear contact or punctiform contact with two embossings (26) of said actuator member (21) extending in alignment perpendicularly of the axis of rotation (1).

8. A liquid friction coupling as set forth in claim 7, wherein said bush (23) has a further extension of reduced diameter, said further extension penetrating corresponding opening (27) of said valve lever, a further shoulder face of said bush being in contact with embossings (28) of said valve lever extending in alignment perpendicularly of the axis of rotation (1).

9. A liquid friction coupling as set forth in claim 8, wherein a screw head (17) of the screw (14) is sunk in a bore of the shaft (2) and the bush (23) is additionally guided in said bore (29) of the shaft (2).

10. A liquid friction coupling as set forth in claim 6, wherein the screw (14) forms a hollow longitudinal bore (36) at least over a portion of its axial length adjacent the head (17) of the screw (14), and transverse bores (35) in the shaft (2) connect this longitudinal bore with openings (37) of components surrounding the shaft (2) so as to permit a flow of cooling air to the side of the coupling which is remote from said actuator member (21).

11. A liquid friction coupling as set forth in claim 6, wherein said bush (23) has a collar (25) and extensions of reduced diameter on both axial ends, said extensions being guided in corresponding openings (12, 27) in the actuator member (21) and in the valve lever (11).

12. A liquid friction coupling as set forth in claim 11, wherein said valve lever (11) is broadened in the area guiding the bush (23), and this broadened area bears against the collar (25) with embossings (28) extending on both sides of the respective opening in alignment perpendicularly to the axis of rotation (1).

13. A liquid friction coupling as set forth in claim 12, wherein a bellows seal (30) is arranged between said bush (23) and said housing front wall (6).

* * * * *